United States Patent [19]
Straniti

[11] 3,881,841
[45] May 6, 1975

[54] DAMPED COMPRESSOR BEARING MOUNTING ASSEMBLY

[75] Inventor: Salvatore Straniti, Orange, Conn.

[73] Assignee: Avco Corporation, Stratford, Conn.

[22] Filed: Nov. 29, 1973

[21] Appl. No.: 420,202

[52] U.S. Cl. .............................. 415/131; 415/170
[51] Int. Cl. ...................... F01d 25/16; F04d 29/04
[58] Field of Search.... 415/131, 132, 170 R, 170 A, 415/170 B, 171, 172 R, 172 A; 308/236

[56] References Cited
UNITED STATES PATENTS

| | | | |
|---|---|---|---|
| 2,648,493 | 8/1953 | Stalker | 415/170 A |
| 2,968,922 | 1/1961 | Gilbert | 415/171 |
| 3,158,413 | 11/1964 | Shelley | 308/122 |
| 3,704,075 | 11/1972 | Karstensen | 415/131 |

Primary Examiner—C. J. Husar
Assistant Examiner—Louis J. Casaregola
Attorney, Agent, or Firm—Charles M. Hogan; Gary M. Gron; Irwin P. Garfinkle

[57] ABSTRACT

A hydrostatically damped bearing for a compressor rotor is mounted relative to a compressor inlet housing by inner and outer sleeves receiving the outer race of the bearing assembly. The sleeves have flanges at one end which sandwich a first shim that sets the proper clearance for the outer race of the bearing to permit hydrostatic damping. A second shim coaxial with and outward from the first shim enables the bearing assembly to be positioned relative to the compressor inlet housing, thus adjusting the clearance of the compressor rotor relative to its shroud.

9 Claims, 3 Drawing Figures

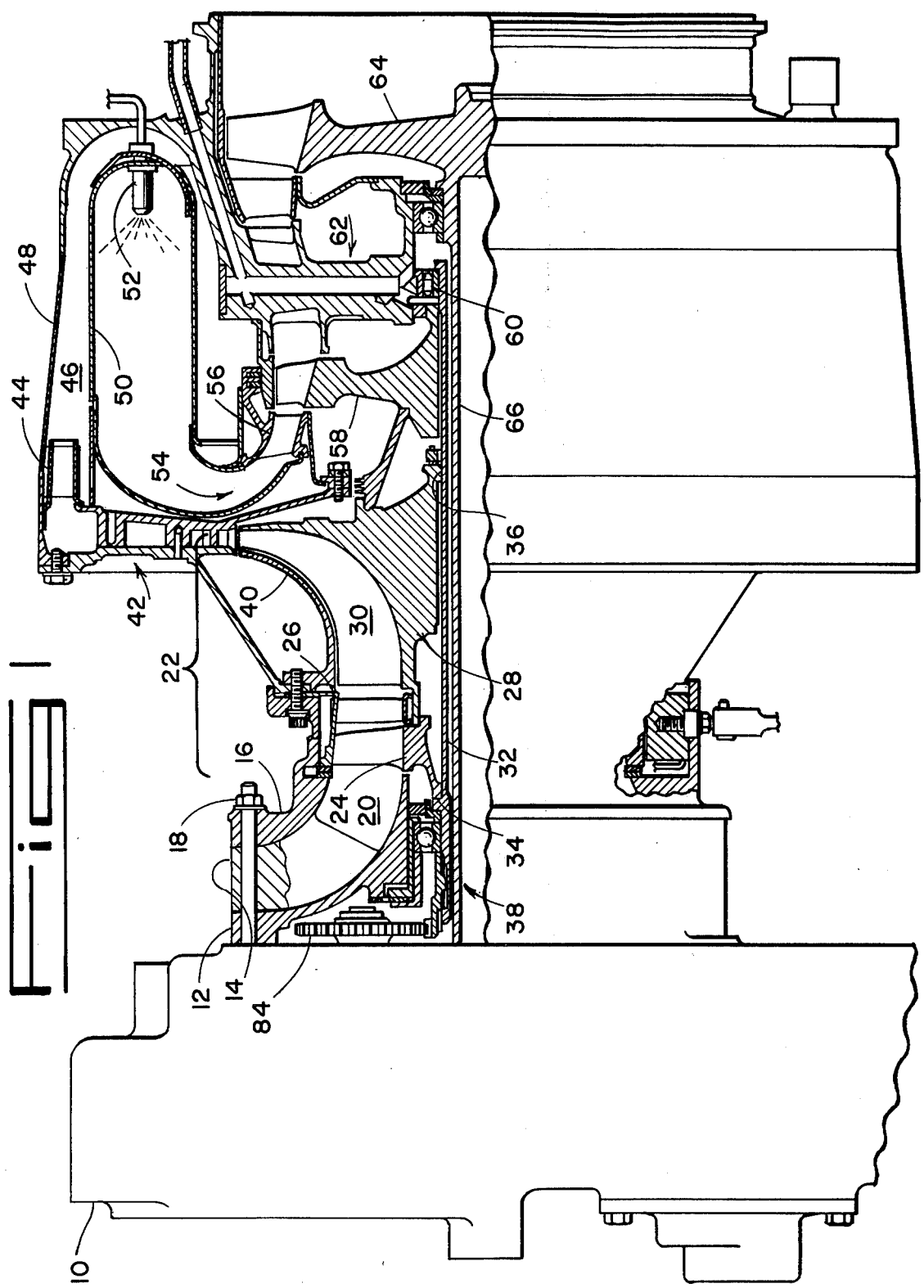

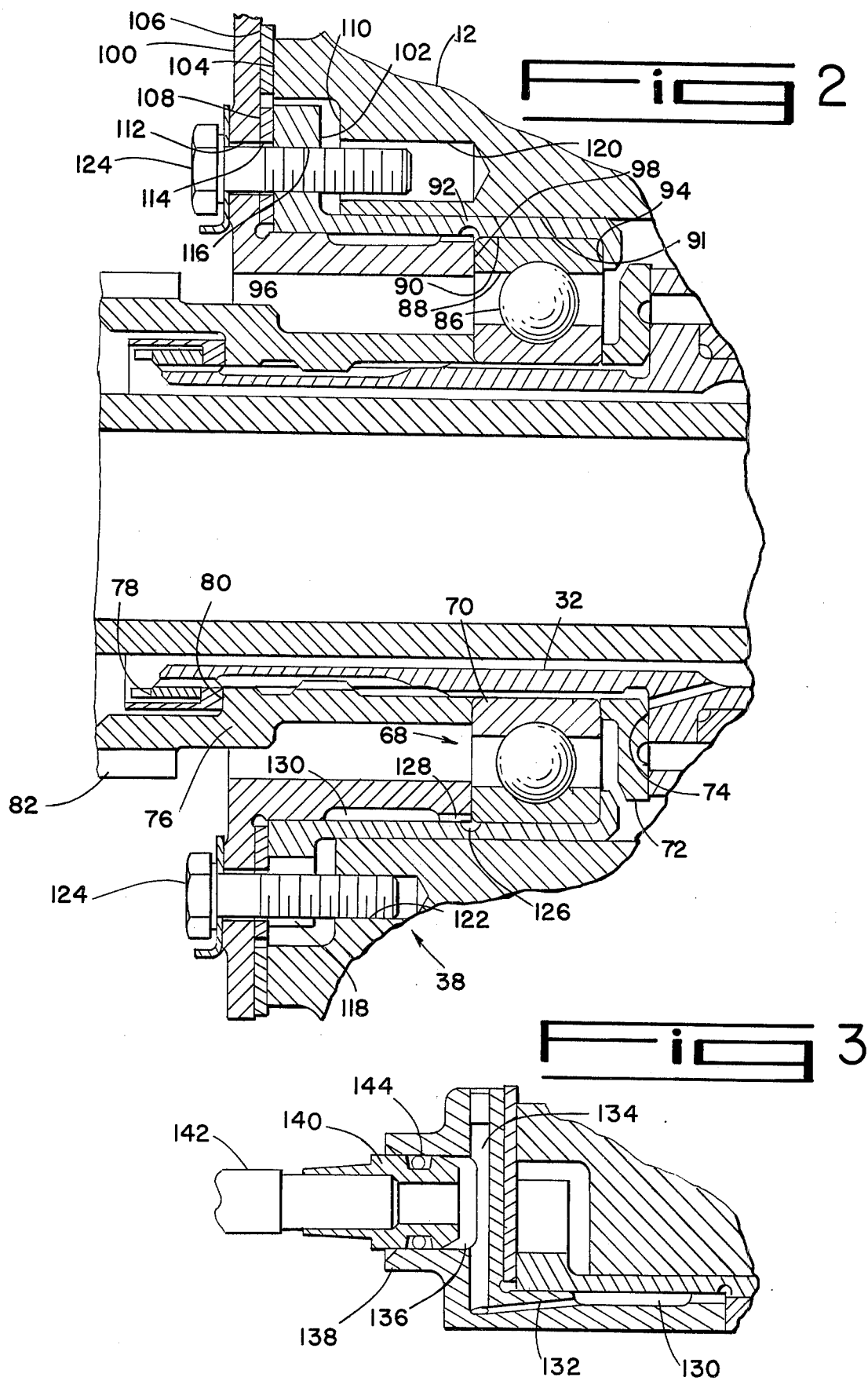

3,881,841

DAMPED COMPRESSOR BEARING MOUNTING ASSEMBLY

The present invention relates to bearing assemblies and more particularly to arrangements for mounting bearing assemblies in gas turbine engines.

With the advent of small, high R.P.M. gas turbine engines there has been a great deal of effort expended on the development of systems for mounting bearing assemblies used to journal rotors in these types of engines. The common objective is to effectively damp vibrations. One such arrangement for damping vibrations may be found in the patent to Shelley, U.S. Pat. No. 3,158,413. In this design a film of lubricating fluid is maintained between the outer race of the bearing and its support to effectively damp out vibrations through hydrostatic action. This is quite an effective way of damping vibrations but it requires a rather complicated and elaborate system for mounting the bearing in the fixed housing of the gas turbine engine. The reason for this is that there must be predetermined clearances between the outer race and its associated mounting components.

The problem is further complicated when the bearing is used to journal a compressor rotor having a centrifugal stage. A contoured annular shroud is positioned around the periphery of the blades on the centrifugal impeller. There needs to be a very precise clearance between these two to permit the most efficient performance without encountering rubbing in both the radial and axial directions. This added function not only complicates the positioning of the bearing but it adds to the space required for the bearing support components.

The above problems are solved in accordance with the present invention by an assembly for mounting in a compressor housing the outer race of a bearing used to journal a compressor rotor. The assembly includes a first annular shim for positioning the outer race of the bearing between axial faces in the assembly with a predetermined clearance. A second annular shim, coaxial with the first shim, is used for positioning the bearing mounting assembly in a predetermined location relative to the compressor housing so that a given clearance may be maintained between the rotor periphery and a shroud formed in the compressor housing.

The above and other related features of the present invention will be apparent from a reading of the description of the disclosure shown in the accompanying drawings and the novelty thereof pointed out in the appended claims.

In the drawings:

FIG. 1 is a simplified longitudinal section view of a gas turbine engine incorporating a bearing mounting assembly which embodies the present invention;

FIG. 2 is a greatly enlarged fragmentary, longitudinal sectional view showing details of the bearing mounting assembly of FIG. 1; and FIG. 3 is a greatly enlarged fragmentary sectional view of the bearing assembly of FIG. 1 showing additional details of its construction.

Referring to FIG. 1 there is shown a gas turbine engine comprising an output gearbox 10 having an annular compressor inlet housing 12 in a conical shape with integral struts 14 extending to an annular section 16. Suitable bolt assemblies 18 connect the compressor inlet housing to the outer gearbox 10. The inlet housing forms an inlet 20 to a compressor 22 comprising a bladed hub 24, a stator assembly 26 secured to the aft end of section 16, and a centrifugal impeller 28 having blades 30. Hub 24 and impeller 28 are both telescoped over a central shaft 32 and held against a forward shoulder 34 on the shaft by a threaded retainer 36. Shaft 32 is journaled for rotation by a bearing mounting assembly, generally indicated at 38, that will be described in detail below.

An annular shroud 40 secured to section 16 conforms to the outer periphery of blades 30 thereby forming a shroud for the compressor 22. Air passing from the compressor 22 enters a diffuser, generally indicated at 42, for increase of its static pressure. From there air passes through a turning vane assembly 44 and into a chamber 46 encompassed by an annular outer housing 48. An annular perforated combustor 50 is positioned within chamber 46 and has fuel nozzles 52 for injecting metered fuel. Pressurized air passes inward into combustor 50 and mixes with the fuel from nozzles 52. The resultant mixture is ignited to generate a hot gas stream which passes through a turning duct 54. This stream is discharged from a turbine inlet nozzle 56 across a bladed turbine hub 58 secured on shaft 32 to drive the compressor hub and impeller 24 and 28. The downstream end of shaft 32 is journaled adjacent hub 58 by a roller bearing 60 suitably mounted in an annular cast strut assembly 62. From there the hot gas stream passes across a bladed disc 64 acting as a power turbine. A shaft 66 integral with disc 64 extends forward to couple the rotary output of the power turbine to a suitable gear set (not shown) in gearbox 10.

Referring to FIG. 1 and particularly to FIG. 2, the bearing mounting assembly 38 comprises a ball bearing assembly 68 having an inner race 70 telescoped over shaft 32 and positioned against a flange 72 which in turn abuts a shoulder 74 on shaft 32. A bearing retainer sleeve 76 telescopes over the end of shaft 32 and against the forward face of inner race 70. A retaining nut 78 threads over the end of shaft 32 and abuts a shoulder 80 on retainer 76 to hold the inner race 70 in place on shaft 32. Retainer 76 may also contain an integral spur gear 82 which meshes with an accessory drive gear 84 in the output gearbox 10 (see FIG. 1).

The bearing assembly 68 has a plurality of ball elements 86 positioned between the inner race 70 and an outer race 88. Outer race 88 is positioned within a clearance surface 90 of an outer sleeve element 92 that is received within an axial bore 91 in housing 12. A lip 94 integral with the end of sleeve 92 restrains axial movement of the outer race 88 in an aft direction. An inner sleeve 96 forming a bearing retainer telescopes into sleeve 92 and has an aft end 98 adjacent the forward face of the outer race 88. Sleeve 96 has an integral flange 100 which extends radially outward behond the periphery of a flange 102 integral with sleeve 92. A first annular shim 104 of a preselected thickness is sandwiched between flange 100 and flange 102. A second annular shim 106 of a preselected thickness is sandwiched between the outer portion of flange 100 and an axial face 108 formed on inlet housing 12. An annular recess 110 extends from annular surface 108 to axial bore 91 to form a clearance for the flange 102.

The flange 100 has a ring of holes 112 spaced around its periphery. Shim 104 has a corresponding ring of holes 114 in alignment with holes 112. Flange 102 has a series of holes in alignment with the holes 112 and 114 which are alternately threaded, as shown by hole 116 or in the form of a clearance notch 118. A set of bores 120 are in alignment with threaded holes 116 and threaded bores 122 are in alignment with the notches 118. A series of bolts 124 extend through the sets of holes in the following manner: Bolts 124, threaded into opening 116, and flange 102 hold the two sleeves 96 and 92 together. Bolts 124, threaded into housing 12, hold the entire assembly in place in the housing 12.

Referring to FIG. 3 and particularly to FIG. 2, a system is provided for supplying lubricating fluid to the clearance space between the periphery of outer race 88 and its associated support for hydrostatic damping. This system comprises an annular recess 126 in sleeve 92 in alignment with the forward edge of outer race 88 and a corresponding recess 128 in the inner sleeve 96 which connects with a larger annular recess 130. A generally axially directed passage 132 and radial passage 134 connect annular recess 130 with an inlet 134 positioned in a boss 138 integral with flange 100. An inlet coupling 140 of a lubricant supply conduit 142 is sealingly received in inlet 136 through the use of an O'ring 144 so that pressurized lubricating fluid may flow into the space around the periphery of outer race 88.

During assembly the bearing 68 is inserted into the sleeve 92 so that outer race 88 is adjacent lip 94. Retainer 96 is inserted into sleeve 92 to sandwich a shim 104 of a given thickness between the flanges 100 and 102. The axial end face clearance between the outer race 88 and the lip 94 or end face 98 is then measured. A shim of appropriate thickness is inserted so that the end face clearance is a predetermined level necessary for proper hydrostatic damping. When this clearance is achieved the bolts 124 are threaded into openings 116 in flange 102. Thus the bearing 68 and the associated mounting sleeves are connected as a module and can be treated as such during further assembly. It should be noted at this point in the assembly that every other opening in the ring of aligned holes receives a bolt.

When the subassembly is completed an outer shim 106 of a given thickness is placed against the flange 100 and the bearing assembly is slipped over the shaft 32 which is already in place within the compressor housing of the engine. The inner race retainer 76 is placed over the shaft 32 and nut 78 threaded in place to hold the bearing assembly and shaft in their assembled position. Bolts 124 are threaded into bores 122 to sandwich shim 106 between flanges 100 and axial face 104.

At this point the clearance between the shroud 40 and the periphery of blades 30 is measured. If the clearance is not at a desired level which is small enough to have minimum tip loss and yet large enough to prevent rubbing, the following procedure is performed. Nut 78 is removed along with bearing retainer 76 so that the bearing assembly can be removed by removing bolts 124 from bores 122. An outer shim 106 of the desired thickness is placed over the inner shim 104 and the bearing assembly reinserted in axial bore 91 so that shim 106 is sandwiched between face 104 and flange 100. Retainer 76 is placed over shaft 32 and nut 78 threaded into place. The bolts 124 are inserted in the remaining ring of holes in the flanges and threaded into bores 122 in housing 12 to hold the entire assembly in place. The clearance is checked at this point and if it is at the desired level the assembly of the engine is completed. If the clearance is not in order it is a simple matter to select a different shim to achieve the final result. It should be noted that axial recess 110 provides sufficient clearance for flange 102 so that use of shims 106 of varying thickness does not cause interference between flange 106 and housing 12.

In operation the lubrication system supplies pressurized lubricating fluid through conduit 142 to inlet 136. This pressurized fluid fills the space between the outer race 88, surface 90, end face 98 and lip 94. Any vibrations of the outer race 88 are damped by the hydrostatic action of the lubricating fluid.

The above bearing mounting assembly is extremely simplified and compact. It enables rapid and accurate assembly with clearances for the bearing damping function and for compressor/shroud clearance. By providing the shims coaxial with one another the assembly is greatly reduced in size, thereby making its use in small gas turbine engines extremely desirable.

This arrangement has been described in connection with a centrifugal impeller since this type of turbomachine component has a shroud substantially turning in a radial direction. The axial adjustment through the use of the outer shim enables the clearance between this shroud and the tips of the blades. This arrangement can also be used with an axial rotor assembly that has a conical shroud conforming to the tips of its blades. While the preferred embodiment of the present invention has been described, it should be apparent that it may be employed in other forms without departing from its spirit and scope.

Having thus described the invention what is claimed as novel and desired to be secured by Letters Patent of the United States is:

1. In a compressor comprising:
   an annular outer housing;
   a rotor assembly including a bladed hub, said housing having a portion defining an annular shroud for said hub;
   a bearing mounting assembly comprising:
      an inner race secured over said rotor assembly and an outer race;
      an outer sleeve receiving the outer race of said bearing, said outer sleeve having an inwardly directed lip defining a first axial face and an outer extending flange;
      an inner sleeve telescoped into said outer sleeve and having an end defining a second axial face, said inner sleeve having an outwardly extending flange adjacent the flange on said outer sleeve, said outer race being positioned between said first and second faces;
   the improvement comprising:
      an assembly for mounting said outer race of said bearing, said assembly including a first annular shim positioned between said flanges, said shim having a given axial thickness for positioning said outer race in said assembly with a predetermined clearance between said first and second axial faces in said assembly, and a second annular shim also having a given axial thickness coaxial with said first shim for positioning said bearing mounting assembly in a predetermined axial position relative to said housing thereby maintaining a predetermined clearance between said shroud and said hub.

2. Apparatus as in claim 1 wherein the flange on said inner sleeve projects outward beyond the flange on said outer sleeve and wherein the outer annular shim is positioned between said flange and an annular face in said housing.

3. Apparatus as in claim 2 wherein said housing has an elongated bore extending from its annular face for receiving said bearing assembly and wherein the flanges on said inner and outer sleeves are positioned at one end thereof so that the outer race of said bearing assembly is telescoped into the bore in said housing.

4. Apparatus as in claim 1 wherein said bearing mounting assembly includes passages for supply of lubricating fluid to the outer race of said bearing for hydrostatic damping, and said apparatus further comprises a conduit for connecting lubricating fluid to said bearing mounting assembly.

5. Apparatus as in claim 4 wherein said inner sleeve has an annular outer facing recess extending to its end face adjacent the outer race of said bearing and a passageway extending from said annular recess to an inlet positioned on said outer extending flange thereby forming the passages in said bearing mounting assembly.

6. Apparatus as in claim 1 wherein:
said outer housing has a bore extending from an axial end face and an annular recess adjacent the radially inward portion of said axial face;
said inner and outer flanges are positioned at one end of said sleeves thereby permitting said sleeves to be telescoped into said bore, the flange on said outer sleeve being received in said annular recess and the flange on said inner sleeve projecting outward beyond the flange on said outer sleeve and adjacent the axial face on said housing to position the outer annular shim therebetween.

7. Apparatus as in claim 6 wherein:
the flange on said inner sleeve and said first annular shim has a ring of aligned through holes;
the flange on said outer sleeve has a plurality of threaded holes aligned with a first set of the holes in the flange on said inner sleeve and said first annular shim and a plurality of clearance passageways aligned with a second set of the aligned holes in the flange on said inner sleeve and said first annular shim;
the annular recess in said housing has a series of threaded bores aligned with the second set of aligned holes in the flange on said inner sleeve and the first annular shim;
said apparatus further comprises a series of bolts extending through said aligned holes, certain of said bolts being threaded into the flange on said outer sleeve for holding said sleeves together and the other bolts being threaded into the threaded bores in said annular housing for holding said sleeves relative to said housing.

8. Apparatus as in claim 7 wherein all of said bolts are the same length and said annular recess has a plurality of bores aligned with the aligned holes in the flange on said inner sleeve and said first annular shim for providing clearance relative to the bolts that have been threaded into said flange on the outer sleeve.

9. Apparatus as in claim 8 wherein said first and second set of aligned holes alternate around the periphery of said flanges.

* * * * *